United States Patent [19]

Walton

[11] Patent Number: 4,830,129
[45] Date of Patent: May 16, 1989

[54] APPARATUS FOR FOUR WHEEL STEERING VEHICLE

[75] Inventor: Erlen B. Walton, Farmington Hills, Mich.

[73] Assignee: Eaton Corporation, Cleveland, Ohio

[21] Appl. No.: 138,783

[22] Filed: Dec. 28, 1987

[51] Int. Cl.$^4$ .............................................. B62D 5/08
[52] U.S. Cl. .................................. 180/140; 180/142; 280/91
[58] Field of Search ................. 180/140, 142; 280/91, 280/DIG. 9, 81.5, 426, 442, 443

[56] References Cited

U.S. PATENT DOCUMENTS

| | | | |
|---|---|---|---|
| 2,761,693 | 9/1956 | Stover | 280/442 X |
| 4,295,657 | 10/1981 | Sano et al. | 280/91 |
| 4,313,514 | 2/1982 | Furukawa et al. | 180/143 |
| 4,621,702 | 11/1986 | Kanazawa et al. | 180/140 |
| 4,646,867 | 3/1987 | Kanazawa et al. | 180/140 |
| 4,666,013 | 5/1987 | Shibahata et al. | 180/141 |
| 4,671,523 | 6/1987 | Naumann | 280/91 |
| 4,697,816 | 10/1987 | Kawamoto et al. | 280/91 |

FOREIGN PATENT DOCUMENTS

| | | | |
|---|---|---|---|
| 60-146758 | 8/1985 | Japan | 180/140 |
| 60-146759 | 8/1985 | Japan | 180/140 |

OTHER PUBLICATIONS

SAE Technical Paper 860624—Improvement of Vehicle Dynamics by Vehicle-Speed-Sensing Four-Wheel Steering System.
Hydronic Corporation Brochure—Remote Control Steering.

*Primary Examiner*—John A. Pekar
*Attorney, Agent, or Firm*—P. S. Rulon

[57] ABSTRACT

A closed hydraulic system (22) is provided for transmitting steering movement to a rear wheel steering assembly (16) in response to steering movement of a front wheel steering assembly (14). The front wheel steering assembly is controlled by a steering wheel (18) and a power steering assembly (20). The closed hydraulic system (22) includes a pump assembly (44) and an actuator assembly (46) connected together by conduits (48,50) to define closed fluid flow branches or fluid links (49,51) for moving a piston (94) in the actuator assembly in response to movement of a piston (72) in the pump assembly. Movement of the actuator piston is transmitted to the rear wheel steering assembly via a cam assembly (92) which effects same direction rear wheel steering for rather small front wheel steering angles and which effects opposite direction rear wheel steering for greater front wheel steering angles. System (22) may include a reservoir assembly (60) including a piston assembly (116) for maintaining a constant positive pressure in both branches, a dash pot (124) for preventing sudden steering angle charges of the rear wheels in the event of rapid fluid loss in either branch, and relief valve assemblies (126) for limiting the maximum pressure differential between the branches.

6 Claims, 4 Drawing Sheets

FIG 2
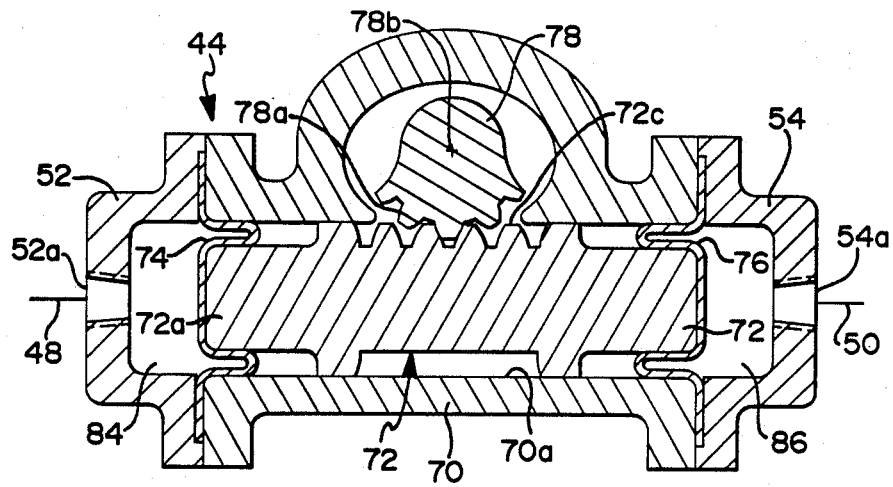
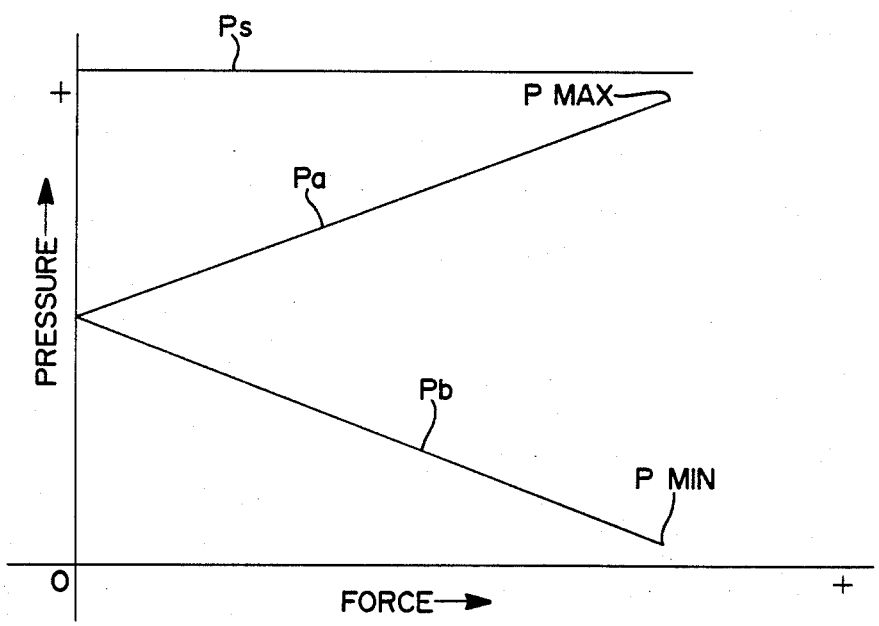
FIG 6

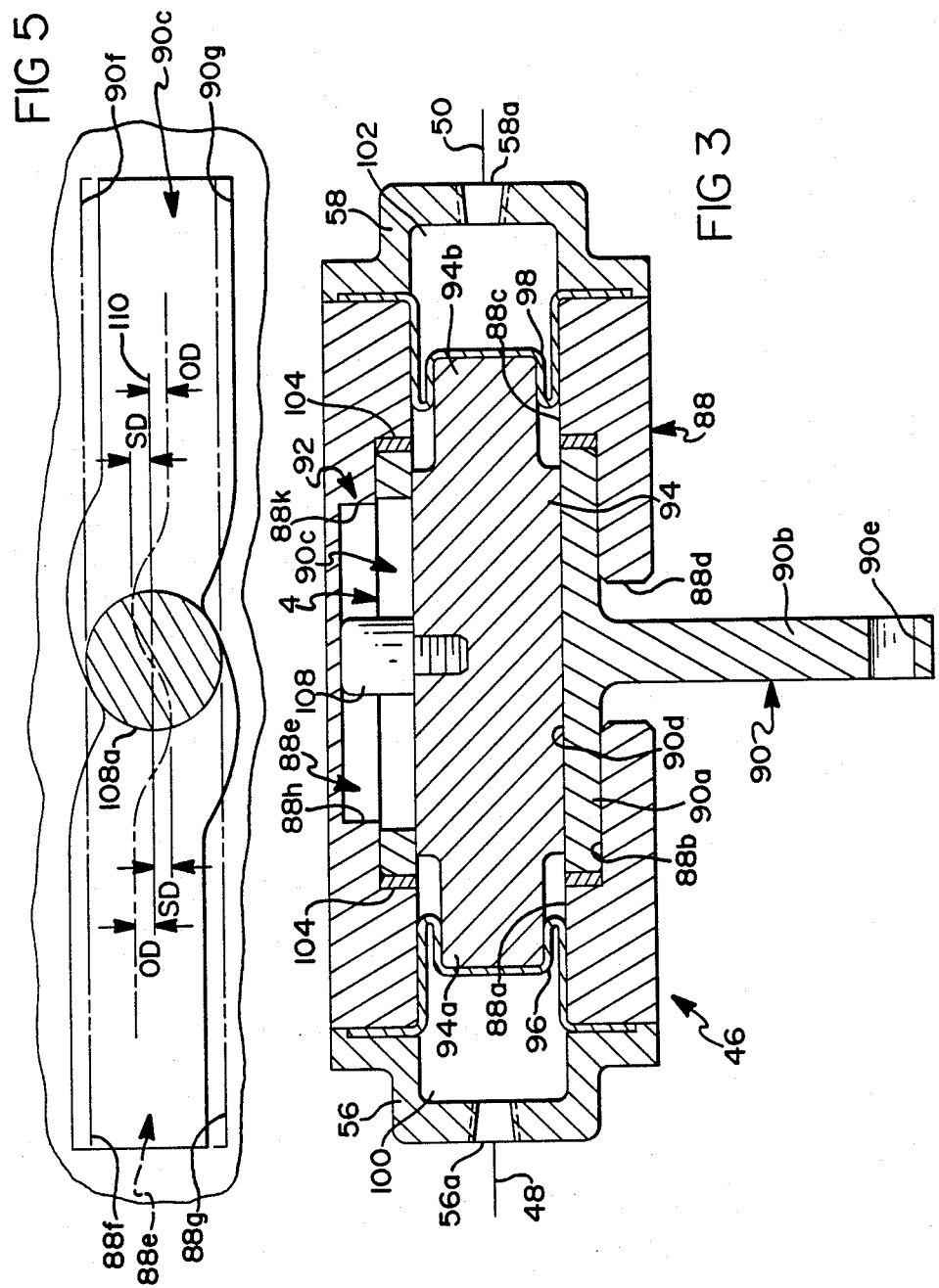

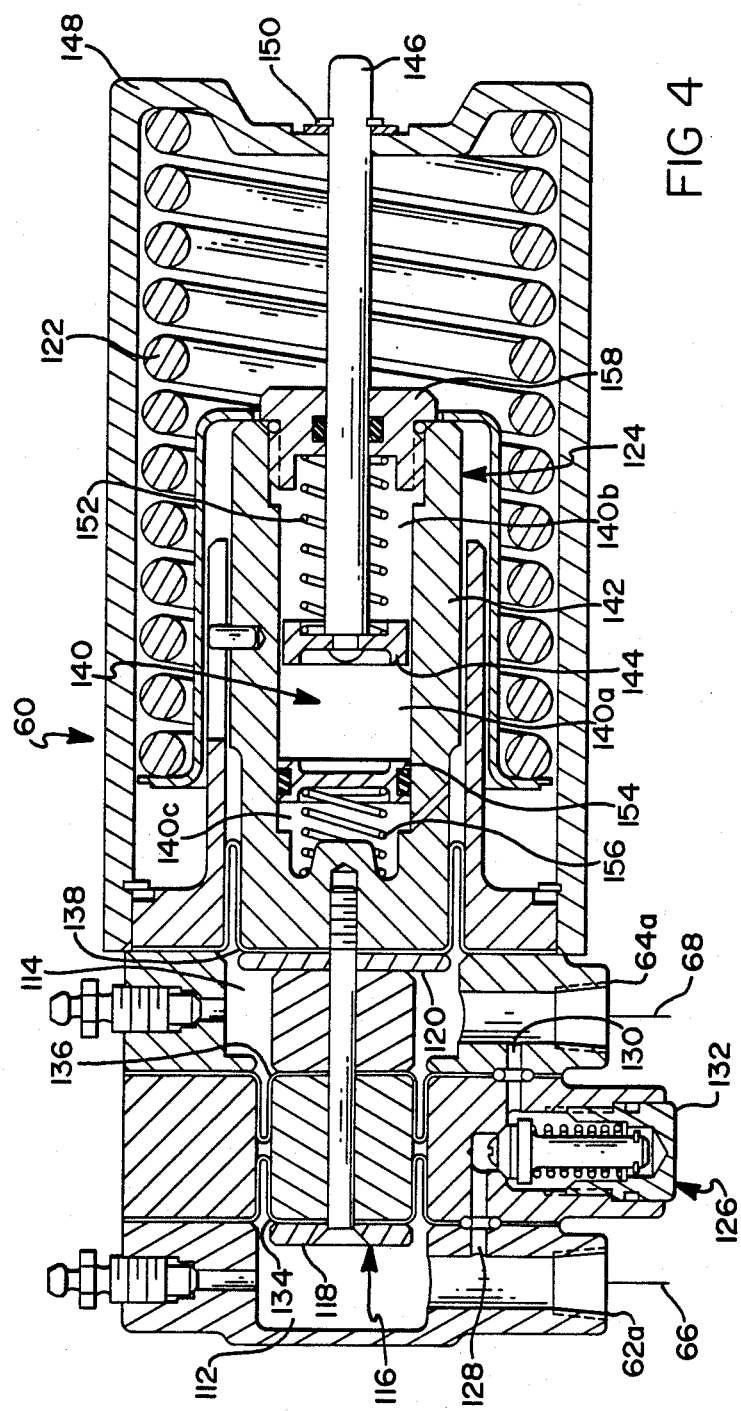

APPARATUS FOR FOUR WHEEL STEERING VEHICLE

FIELD OF INVENTION

The present invention relates to four wheel steering. More specifically, the invention relates to apparatus for transmitting steering movement to a rear wheel steering assembly of a vehicle in response to steering movement of a front wheel steering assembly.

DESCRIPTION OF THE PRIOR ART

The purpose of four wheel steering is of course to reduce vehicle turning radius and/or to improve high speed performance of the vehicle. It is known to employ electrical, electrohydraulic, hydromechanical, or mechanical apparatus to transmit steering movement to rear wheel steering assemblies of vehicles in response to steering movement of front wheel steering assemblies. In practice, implementation of such apparatus has been expensive, has been somewhat unreliable, and/or has provided less than optimum performance. Further, hydromechanical and mechanical apparatus have been difficult to package into available vehicle space and have been difficult to protect against the harsh environment in which vehicles operate.

In a known four wheel steering system, steering movement of a front wheel steering assembly is transmitted to a rear wheel steering assembly via a mechanical apparatus in the form of a rotatably mounted shaft means extending longitudinally of the vehicle between the front and rear wheel steering assemblies. The rotatably mounted shaft means senses steering movement of the front wheel steering assembly and also transmits power for steering the rear wheel steering assembly. It is also known to convert this mechanical apparatus to a hydromechanical apparatus by connecting the output of the rotatably mounted shaft to a valve which ports pressurized hydraulic fluid from a motor driven pump to a power cylinder operative to transmit steering movement to the rear wheel steering assembly. It is also known to provide such mechanical and hydromechanical apparatus with a geared transmission operative to reverse the output direction of the rotatably mounted shaft means when the steering angle of the front wheel steering assembly exceeds a predetermined amount, thereby changing the steering direction of the rear wheels relative to the front wheels from the same direction to opposite direction.

SUMMARY OF THE INVENTION

An object of this invention is to provide inexpensive and reliable apparatus for transmitting steering movement to a rear wheel steering assembly.

Another object of this invention is to provide such an apparatus which is also readily packaged into available space of vehicles.

Another object of this invention is to provide simple, inexpensive, and reliable means for reversing the steering angle of the rear wheels when the steering angle of the front wheels exceeds a predetermined angle.

According to a feature of the invention, a wheeled vehicle steering system comprises first means for transmitting steering movement of a steering wheel to a front wheel steering assembly; second means for transmitting steering movement to a rear wheel steering assembly in response to steering movement of the front wheel steering assembly. The second means comprises a hydraulic system including first and second closed fluid flow branches, one end of each branch defined by first and second pumping volumes of a pump having pumping means mechanically moved in response to steering movement of front wheel steering assembly, the pumping means operative to effect fluid flow in said branches by inversely varying the volumes of the pumping volumes, the other end of each closed branch defined by first and second actuating volumes of an actuator having actuating means moved in response to the fluid flow, the actuating means operative when moved to inversely vary the volumes of the actuating volumes and the actuating means operative when moved to effect steering movement of the rear wheel steering assembly.

BRIEF DESCRIPTION OF THE INVENTION

An apparatus according to the present invention is shown in the accompanying drawings in which:

FIGS. 2-4 are detailed views of components of the apparatus;

FIG. 5 is an enlarged partial view of a cam slot in the component of FIG. 3 looking in the direction arrow 5 in FIG. 3; and FIG. 6 is a graph of hydraulic system pressure in the apparatus.

DETAILED DESCRIPTION OF THE DRAWINGS

Figure 1:
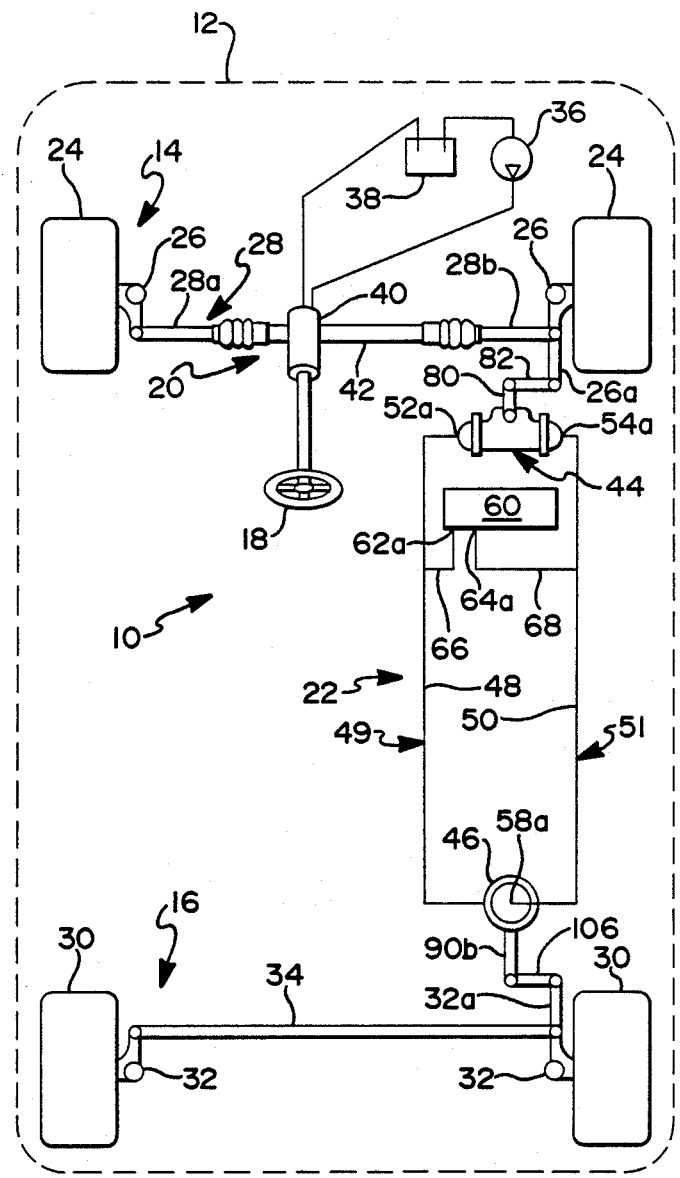
FIG. 1 is a schematic plan view of a vehicle having the apparatus of the invention disposed between front and rear wheel steering assemblies.

The schematic plan view of FIG. 1 illustrates a steering system 10 for a wheeled vehicle having a body represented by phantom line 12, and front and rear steerable wheel assemblies 14, 16. The system includes a steering wheel 18, apparatus or first means 20 for transmitting steering movement of the steering wheel to the front wheel steering assembly, and a closed hydraulic system or second means 22 for transmitting steering movement to the rear wheel steering assembly in response to steering movement of the front wheel steering assembly.

The front wheel steering assembly 14 includes front wheels 24 each having a steering knuckle arm 26 pivotally connected together by tie rod ends 28a, 28b of a tie rod or ram 28 disposed for to-and-fro movement transverse to the longitudinal direction of the vehicle in known manner. The tie rod or ram 28 forms part of apparatus 20 and is discussed further hereinafter. The rear wheel steering assembly 16 includes rear wheels 30 each having a steering knuckle arm 32 pivotally connected together by a tie rod 34 disposed for to-and-fro movement transverse to the longitudinal direction of the vehicle.

Apparatus 20 may be any of several well known mechanical non-power or power steering assemblies which transmit steering movement to front wheel steering assemblies in response to steering movement of a steering wheel. Apparatus 20 is preferably of the power steering type and, as illustrated therein, is of the well known hydraulic type including a source of pressurized hydraulic oil or fluid provided by a pump 36 in known manner, a sump 38, and a servo valve 40 for connecting or communicating the source and sump with opposite sides of an unshown piston disposed in a power cylinder 42. Tie rod ends 28a, 28b extend from opposite sides of the pistons and move together in to-and-fro motion in response to alternate porting or communication of opposite sides of the piston with the source and sump by valve 40.

Closed hydraulic system 22 includes a pump assembly 44 (see FIGS. 1, 2), an actuator assembly 46 (see FIGS. 1, 3), and conduits or passages 48, 50 respectively connected at one end to ports 52a, 54a defined by end caps 52, 54 of the pump assembly and respectively connected at the other end to ports 56a, 58a defined by end caps 56, 58 of the actuator assembly. System 22 may also include a reservoir assembly 60 having ports 62a, 64a respectively connected to conduits 48, 50 by conduits or passages 66, 68.

Pump assembly 44 includes a cylinder portion or center housing member 70 defining a cylindrical bore 70a, a piston member or movable means 72 slidably disposed in the bore and having oppositely facing ends 72a, 72b supporting roll type diaphragms 74, 76, the end caps 52, 54, and a pinion 78 having teeth 78a in mesh with rack teeth 72c defined by piston 72. Pinion 78 is supported for rotation by housing member 70 in a conventional manner and is rotated about its axis 78b in response to steering movement of the front wheel steering assembly by a linkage assembly. The linkage assembly includes a rigid extension 26a of steering knuckle arm 26, an arm 80 non-rotatably fixed at one end to pinion 78, and a link 82 pivotally connected at its opposite ends to extension 26a and arm 80. Diaphragms 74, 76 are sealingly sandwiched between the housing and end caps to define volumes 84, 86. The end caps are secured to the housing in known manner, e.g., by unshown screws. Volumes 84, 86 vary inversely in volume in response to sliding movement of the piston due to rotation of pinion 78. Diaphragms 74, 76 hermetically seal the volumes at piston ends 72a, 72b and, in combination with piston 72, provide a movable partition sealingly separating the volumes against fluid communication therebetween.

Actuator assembly 46 includes a housing assembly shown herein for illustration purposes as a one piece housing member 88 having coaxial bore portions 88a, 88b, 88c; an actuating member 90 rotated by a cam assembly 92 in response to sliding movement of a piston or movable means 94, roll type diaphragms 96, 98 supported by oppositely facing ends 94a, 94b of the piston, and the end caps 56, 58. In a manner analogous to pump 44, diaphragms 96, 98 are sealingly sandwiched between the housing and caps 56, 58 to define volumes 100, 102 which vary inversely in volume in response to sliding movement of piston 94. More specifically, volumes 100, 102 vary inversely in volume in response to sliding movement of pump piston 72, and thereby effect sliding movement of piston 94. The diaphragms also hermetically seal the volumes at the piston ends 94a, 94b and, in combination with piston 94, provide a movable partition sealingly separating volumes 100, 102 against fluid communication therebetween.

Looking now at actuating member 90 and cam assembly 92, member 90 includes a cylindrical portion 90a supported on its outer surface for limited to-and-fro rotation by bore portion 88d, an arm portion 90b extending radially from the cylindrical portion and through a circumferentially extending clearance slot 88d in the housing member, and a curved cam slot 90c shown enlarged in the partial view of FIG. 5 with straight cam slot 88e projected thereon in phantom line. Axial movement of the cylindrical portion is prevented by annular thrust bearings 104. A bore 90d in the cylindrical portion 90a and bore portions 88a, 88c of the housing member define a continuous bore for sliding movement of piston 94. An opening 90e in arm portion 90b pivotally connects to a linkage assembly for moving the rear wheel steering assembly through steering angles in response to rotation of actuating member 90. The linkage assembly includes a rigid extension 32a of rear steering knuckle arm 32 and a link 106 pivotally connected at its ends to extension 32a and arm portion 90b.

Conduits 48, 50, pump volumes 84, 86, and actuator volumes 100, 102 define first and second closed fluid flow branches or closed fluid links 49, 51 between the pump and actuator pistons. The branches are filled with a non-compressible oil. Hence sliding movement of pump piston 72 in response to steering movement of the front wheel steering assembly causes fluid flow in both branches and a corresponding sliding movement of actuator piston 94. The pistons move the same amount where the displacement surface areas of their piston ends and diphragms are the same. Sliding movement of actuator piston 94 may be transmitted directly to effect steering movement of the rear wheel steering assembly or transmitted via actuating member 90 and cam assembly 92.

Cam assembly 92 includes the curved cam slot 90c having oppositely facing curved cam surfaces 90f, 90g defined by the wall of cylindrical portion 90a, a straight cam slot 88e having straight cam surfaces 88f, 88g defined by the wall of housing member 88, and a cam follower 108 extending radially from piston 94. Follower 108 has an outer cylindrical surface 108a of diameter slightly less than the width of cam slots 90a, 88e to allow movement of the follower in the slots and to limit free play. The outer cylindrical surface of follower 108 may be supported by an unshown antifriction bearing to reduce friction.

Straight slots 88e prevents rotation of piston 94 and cam follower 108 relative to the housing member. Curved slot 90c forces actuating member to rotate in directions and through angles according to its preselected cam profiles. Line 110 in FIG. 4 represents the longitudinal center of straight slot 88e. Dimensions SD and OD represent maximum same and opposite direction steering angles when the follower is moved in either direction from its shown neutral position corresponding to straight ahead steering of the front wheels.

In the disclosed embodiment, the profile of curved cam slot 90c is selected to first rotate actuating member 90 in directions effecting same direction steering of the front and rear wheels and then opposite direction steering in response to increased front wheel steering angles. By way of example, maximum same and opposite direction steering angles are 2 degrees for the disclosed embodiment. However, as may be seen, the profile is readily changed to provide different same and opposite direction steering angles. Further, the profile of curved cam slot 90c may be selected to cause only same direction steering, opposite direction steering, and/or steering angles that are not the same for left and right turns. Alternatively, cam assembly 92 may be disposed between the front wheel steering assembly 14 and piston 72 and rear wheel steering linkage may be moved in direct response to movement of actuator piston 94, whereby fluid flow in closed branches 49,51 and movement of actuator piston 94 will vary according to the curved cam profiles 90f, 90g.

Looking now at FIG. 4, closed hydraulic system 22 is preferably provided with reservoir assembly 60 which includes closed reservoir chambers 112, 114 respectively communicating with conduits 48, 50 or branches 49, 51, a piston assembly 116 having circular and annular surfaces 118, 120 facing axially in the same direction and of substantially equal effective area acting on the fluid in chambers 112, 114, a spring 122 biasing the surface areas in direction tending to decrease the volumes of the chambers and therefore applying equal precharge pressures to both branches when no external forces are acting on the pump and/or actuator pistons, and a damper or dash pot like assembly 124 for limiting the rate of movement of piston assembly 116. The purpose of dash pot assembly 124 is to prevent rapid change in the rear wheel steering angle in the event of rapid fluid loss in either of the branches. For convenience sake, the reservoir has incorporated therein two relief valve assemblies 126; only one assembly is shown. The valves assemblies relieve excess differential pressure between the branches to prevent loss of front wheel steering control due to rear wheel steering overload. The valve assemblies differ mainly with respect to the position of passages 128, 130, i.e., the passages for the shown valve are positioned to effect high pressure relief in branch 49 and the passages for the unshown valve are positioned to effect high pressure relief in branch 51. At least one of the valve assemblies includes a threaded member 132 which may be backed out to allow free fluid flow between the branches for repositioning the pumps and/or actuator piston to their neutral positions after correction of a over pressure condition.

The reservoir chambers 112, 114 are hermetically sealed by three roll type diaphragms 134, 136, 138 in a manner analogous to the diaphragms in pump and actuator assemblies 44, 46. Dash pot assembly 124 includes a cylindrical chamber 140 formed in a member 142 of the piston assembly, a loosely fitting piston 144 dividing the chamber into subchambers 140a, 140b, a rod 146 fixed at one end to piston and secured to a housing member 148 by a snap ring 150 which limits leftward movement of the piston relative to the housing member, a spring 152 biases the piston and rod leftward, and a third subchamber 140c vented to ambient and sealed from subchamber 140a, 14b by a slidable piston 154 biased rightward by a spring 156. Chambers 140a, 140b are filed with a non-compressible viscous fluid such as silicone fluid which extrudes through the space between piston 144 and the cylinder wall to prevent rapid leftward movement of piston assembly 116. Subchamber 140c facilitates silicone fluid displacement when an end cap 158 threaded into the open end of cylindrical chamber 140 and also accommodates thermal expansion of the silicone fluid.

The biasing force of reservoir spring 122 acting on the hydraulic oil in branches 49, 51 via piston surface areas 118, 120 maintains the sum of the fluid pressures in the branches substantially constant during non-operational and operational modes of the closed hydraulic system. The graph of FIG. 6 illustrates the hydraulic pressure characteristics in branches 49, 51 as external forces acting on pump and actuator pistons 72, 94 increase from zero in response to steering forces transmitted by front and rear wheel steering assemblies 14, 16. A curve $P_a$ represents the pressure in one branch, a curve $P_b$ represents the pressure in the other branch, and a constant pressure curve $P_s$ represents the sum of the pressures in both branches during all modes of operation. As the forces for maintaining or changing rear wheel steering angles in any direction increase, the pressure in the branch providing the necessary force increases proportionally and the pressure in the other branch decreases proportionally.

As previously mentioned, one purpose of relief valve assemblies 126 is to prevent loss of front wheel steering control due to excessively high pressures caused by rear wheel steering overload. Another purpose for the relief valves is to maintain a positive fluid pressure in both branches, thereby preventing reverse flexing of the roll type diaphragms in the pump, actuator and reservoir assemblies. The positive pressure is maintained by setting $P_{max}$ of both valves to a pressure less than $P_s$, thereby ensuring that $P_{min}$ is always positive since $P_{max} + P_{min} = P_a + P_b = P_s$ and since $P_{max} < P_s$.

A preferred embodiment of the invention has been disclosed for illustrative purposes. Many variations and modifications of the disclosed embodiment are believed to be within the spirit of the invention. The following claims are intended to cover the inventive portions of the disclosed embodiment, variations and modifications believed to be within the spirit of the invention.

What is claimed is:

1. A steering assembly for a wheeled vehicle having front and rear dirigible wheels, the system comprising:
   first means for transmitting steering movement of a steering wheel to a front wheel steering assembly;
   second means for transmitting steering movement to a rear wheel steering assembly in response to steering movement of the front wheel steering assembly; the improvement wherein the second means comprises:
   a hydraulic system including first and second closed fluid flow branches, one end of each branch defined by first and second pumping volumes of a pump having a first movable means connected to and moved in response to steering movement of the front wheel steering assembly, said movable means operative to effect fluid flow in said branches by inversely varying the volumes of said pumping volumes, the other end of each closed branch defined by first and second actuating volumes of an actuator device having a second movable means moved in response to said fluid flow, said second movable means operative when moved to inversely vary the volumes of said actuating volumes and said second movable means connected to and operative when moved to effect steering movement of the rear wheel steering assembly;
   first and second mechanical drive means respectively connecting the first and second movable means to the front and rear steering assemblies; and
   a cam assembly drivingly interposed between one of said movable means and the associated drive means, said cam assembly having cam profile means for effecting movement of the rear wheel steering assembly in directions effecting same direction steering of the front and rear wheels for front wheel steering angles below a predetermined amount.

2. The steering assembly of claim 1, wherein said cam profile means effects opposite direction steering of the front and rear wheels for front wheel steering angles greater than said predetermined amount.

3. The steering assembly of claim 2, wherein:

said one movable means includes a piston disposed for axial movement in a bore of a housing of said actuator device; and said cam assembly includes cam follower means fixed to said movable means and reacting between straight and curved surface means with respect to the follower means, said curved surface means defining said cam profile means and bring drivingly connected to said drive means, said straight surface means preventing rotation of the piston in the housing bore and providing reaction surface effecting steering movement of the second drive means via cam action between the follower means and the curved surface means in response to axial movement of the piston, the steering movement of said second drive means effecting said same direction steering when the front wheel steering angles are below said predetermined amount.

4. The steering assembly of claim 3, wherein:

said cam action effects opposite direction steering of the front and rear wheels when the front wheel steering angles are greater than said predetermined amount.

5. The steering assembly of claim 1, wherein:

said one movable means includes a piston disposed for axial movement along an axis of a bore in a housing;

means mounting said associated drive means for limited rotation about an axis parallel to said bore axis, whereby the piston and the drive means are slaved respectively for axial movement along the bore axis and rotation about the associated drive means axis.

6. The steering assembly of claim 2, wherein:

said cam assembly includes cam follower means fixed to said movable means and reacting between straight and curved surface means with respect to the follower means, said curved surface means defining said cam profile means and bring drivingly connected to said associated drive means, said straight surface means preventing rotation of the piston in the housing bore and providing reaction surface effecting limited rotation of the associated drive means in response to axial movement of the piston and axial movement of the piston in response to rotation of the associated drive means.

* * * * *